Figure 10:
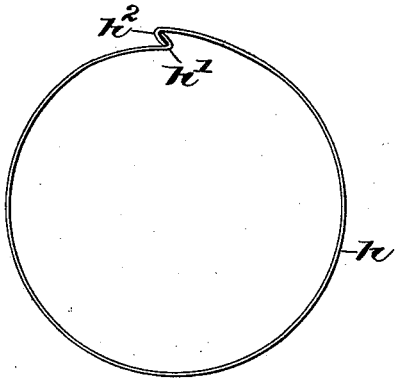

(No Model.) 2 Sheets—Sheet 1.
R. COWEN.
TIRE ATTACHING DEVICE FOR VEHICLE WHEELS.
No. 583,865. Patented June 1, 1897.
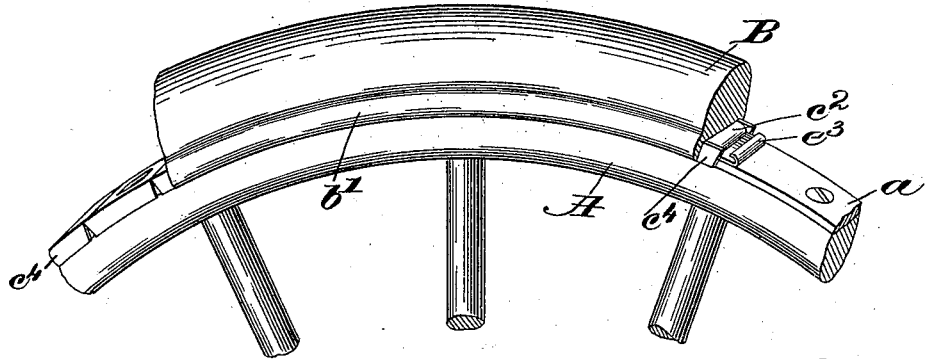
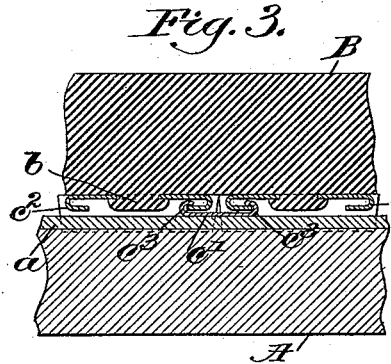 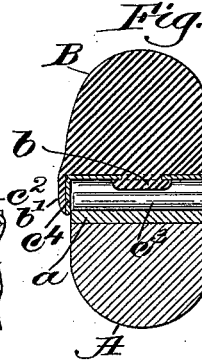 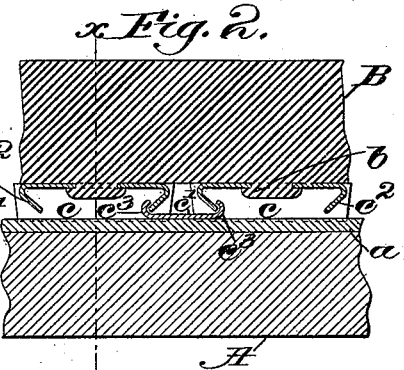
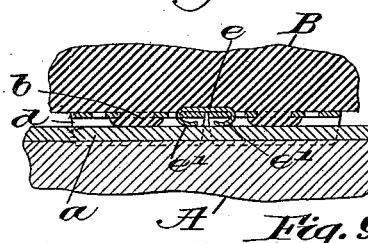 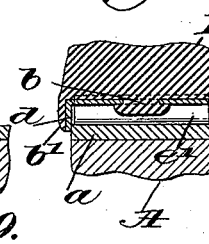 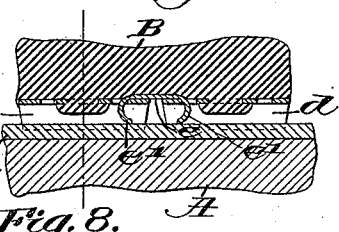
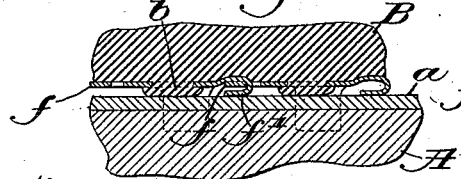 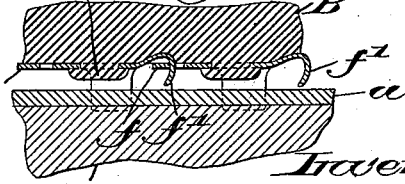
Witnesses:
A. C. Harrison
Thomas J. Drummond
Inventor:
Robert Cowen.
by Crosby & Gregory
attys.

(No Model.) 2 Sheets—Sheet 2.
R. COWEN.
TIRE ATTACHING DEVICE FOR VEHICLE WHEELS.

No. 583,865. Patented June 1, 1897.

Witnesses:
A.C. Harman
Thomas J. Drummond

Inventor:
Robert Cowen.
by Crosby Gregory
attys

UNITED STATES PATENT OFFICE.

ROBERT COWEN, OF CAMBRIDGE, MASSACHUSETTS, ASSIGNOR TO THE BOSTON WOVEN HOSE AND RUBBER COMPANY, OF BOSTON, MASSACHUSETTS.

TIRE-ATTACHING DEVICE FOR VEHICLE-WHEELS.

SPECIFICATION forming part of Letters Patent No. 583,865, dated June 1, 1897.

Application filed May 15, 1893. Serial No. 591,611. (No model.)

*To all whom it may concern:*

Be it known that I, ROBERT COWEN, of Cambridge, county of Middlesex, State of Massachusetts, have invented an Improvement in Tire-Attaching Devices for Vehicle-Wheels, of which the following description, in connection with the accompanying drawings, is a specification, like letters on the drawings representing like parts.

This invention relates to devices for attaching tires, preferably of rubber or other yielding material, to the rims of vehicle-wheels.

My invention has especial reference to that class of tire-attaching devices adapted to be circumferentially shortened after application to the wheel-rim to thereby tighten the said attaching device or the tire held thereby upon said wheel-rim.

Prior to my invention it has been common to attach a yielding or rubber cushion-tire upon the wheel-rim by passing a wire lengthwise or circumferentially through the tire and drawing the ends of said wire together to circumferentially shorten the wire by means of a turnbuckle or drawing said ends together and uniting them in suitable manner, as by electric welding; but both these modes are open to the objection that they are not convenient or capable of being carried out without the use of special tools or appliances.

The aim of my invention is to provide a tire-attaching device which may be applied by any workman without the use of special tools or appliances and which is inexpensive and easily adapted to any diameter of wheel.

My invention broadly consists in a tire-attaching device which is constructed to shorten circumferentially for tightening upon or about the wheel under the action of an external pressure, and preferably my invention is embodied in an attaching device provided with one or more laterally-extended tightening portions, which under external pressure may be bent or otherwise changed in form to cause circumferential shortening of the attaching device as a whole.

For convenience in manufacture and also convenience in adapting the attaching device to wheels of varying diameters I prefer to embody my invention in a device made up of a plurality of independent members, like a chain, a portion or all of which will be provided with suitably-constructed laterally-extended shortening portions, which also may constitute the means for joining the several members or links so provided and which under external pressure, after the said attaching device with its tire is applied to the wheel, will change their form and thereby shorten the attaching device and cause it to be held in place on the wheel-rim.

In order that my invention may be clearly understood, I will proceed to describe the same as embodied in several constructions, and referring to the drawings—

Figure 1, in perspective, shows a portion of a wheel with a section of tire arranged thereupon and attached thereto by an attaching device containing my invention; Fig. 2, a vertical longitudinal section through a portion of the tire, wheel-rim, and attaching device previous to application of external pressure to the latter; Fig. 3, a similar view showing the changed form of attaching device after the application of external pressure and as it will appear when in final position upon the wheel-rim; Fig. 4, a vertical cross-section on the dotted line $x\ x$, Fig. 2; Figs. 5, 6, and 7, views similar to Figs. 2, 3, and 4, showing a different construction of attaching device; Figs. 8 and 9, views similar to Figs. 2 and 3, showing yet another form of embodiment of my invention; and Figs. 10 and 11, details illustrating other modifications of my invention.

In the embodiment of my invention illustrated in Figs. 1 to 4, inclusive, referring to the drawings, A is the wheel-rim, of any suitable or desired shape, construction, or material, and, so far as my invention is concerned, it may be provided with the usual iron tire $a$, such as carriage-wheels are ordinarily provided with.

The tire B may be of any desired material, shape, or construction, it being herein shown and preferably as of rubber or other yielding or soft material, it being secured to the attaching device in suitable manner.

In the embodiment of my invention shown in Figs. 1 to 4 the attaching device consists of a plurality of independent members $c$ $c'$, the members $c$ being shown as provided, respectively, at their ends with downturned or inturned laterally-extended and preferably angular shortening portions $c^2$, shown as engaging the upturned or hooked ends $c^3$ of the interposed members $c'$, said laterally-extended portions $c^2$ and upturned or hooked end $c^3$ constituting the means for flexibly uniting the several members of the attaching device. The members $c^2$ are shown as provided with inturned side flanges $c^4$ to form a proper finished edge to the attaching device, and said members are also shown as provided with suitable perforations into or through which protrude portions $b$ of the tire to thereby unite the tire to the attaching device.

The attaching device, with its tire, described may be made of any desired length and cut off in suitable lengths to extend about the wheel-rim, and when carried about said wheel-rim the laterally-extended shortening portion $c^2$ of the member at one end of the section thus cut is engaged with the upturned or hooked end $c^3$ of the member $c'$ at the opposite end of the said section, the tire and attaching device being then loosely applied to the wheel-rim. By means of a hammer, roller, or other suitable device external pressure is now applied to the tire and through the same to the attaching device to flatten the laterally-extended portion $c^2$ upon the wheel-rim, as illustrated in Fig. 3, said shortening portions as they are thus flattened being changed in form in a manner to cause the members $c$ $c'$ to be drawn closer together end to end, and thereby circumferentially shorten the attaching device about and to tighten the same upon the wheel-rim, the said flanges $c^4$ being at the same time carried inwardly at opposite sides of the wheel-rim to prevent lateral displacement of the attaching device about the wheel-tire.

It will be evident that an ordinary wheelwright without any special appliances may sever the tire and its connected attaching device in proper lengths and apply the same to any wheel in a very short space of time, and when so applied there is practically no danger of the tire being displaced, for when in use the load upon the wheel produces constantly a rolling pressure upon the exterior of the tire, tending to further tighten the attaching device upon the wheel-rim.

While in some instances it may be desirable to apply the tire to the attaching device under a state of tension, so that when the attaching device is subsequently shortened upon the wheel the tire will be permitted to contract to or to resume its normal position, yet for practical purposes I prefer to apply the tire to the attaching device when the former is in its normal position, so that the subsequent shortening of the attaching device about the wheel will cause a circumferential compression of the tire, which will act to close punctures or cuts in the tire and preserve, in so far as may be possible, a continuous and perfect tread-surface to the tire.

Of course it is possible with my invention to form the tire in an endless or unbroken ring and still attach it properly to the wheel, but for convenience the tire will be made in long lengths and severed at the proper points to enable it to be wrapped about the wheel-rim.

In Figs. 5, 6, and 7 the attaching device is composed of independent members $d$ and $e$, the latter only being provided with the laterally-extended shortening portions, (indicated at $e'$,) which, however, under external pressure will operate to circumferentially shorten the attaching device upon and to grip the wheel-rim, as described in the construction Figs. 1 to 4, inclusive, the same also as to the construction Figs. 8 and 9, where the attaching device is composed of similar members $f$ $f$, each provided with a hook-shaped laterally-extended shortening portion $f'$, engaging an eye in the adjacent end of the next member of the series.

In Fig. 10 is shown a single straight band $h$, having its ends hooked together, said hooked ends $h'$ $h^2$, either or both, constituting the laterally-extended shortening portions, adapted, under external pressure, to change in form and circumferentially shorten the band-attaching device about the wheel-rim.

Figure 11:
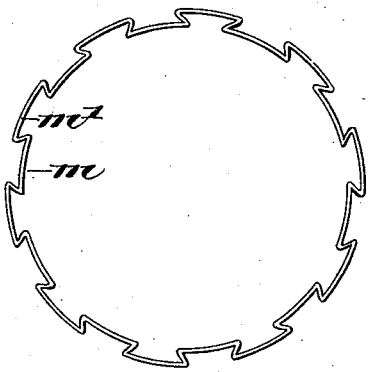

In Fig. 11 is shown an endless band $m$, provided with one or more, preferably a plurality of, corrugations $m'$, forming laterally-extended bending portions $m^2$, which under pressure will flatten or otherwise change in form to shorten the attaching device about and upon the wheel-rim.

In any event the tire is preferably provided with side lips $b'$, which conceal the edges of the attaching device and present a smooth finished appearance to the tire-wheel.

It is obvious that my invention is not limited to the particular embodiments herein shown, since I am the first so far as I am aware to provide an attaching device for wheel-tires which after it is applied to the wheel may, under pressure, have its form changed in such manner as will shorten the attaching device to make it circumferentially smaller to thereby draw it into holding engagement with the wheel-rim, and such a device may be used in many ways and may be connected with the tire or applied to the wheel-rim in different ways, as may best suit the fancy of the maker or the particular tire or wheel in connection with which it is to be used.

In my invention it will be noted that the form of attaching device is altered in order to shorten it, whereas in devices embodying a band or wire passed longitudinally through the tire and having its ends drawn together to reduce the diameter of the wire or band the form remains the same, but the size is changed.

Having described my invention and without limiting myself as to details, what I claim as new, and desire to secure by Letters Patent, is—

1. A tire-attaching device having means interposed throughout its length to shorten the length thereof at a plurality of points under the action of downward external pressure thereupon against the rim of the wheel, substantially as described.

2. A tire-attaching device provided with one or more laterally-extended shortening portions, bent or changed in form, under external pressure, arranged to be acting toward the wheel-rim to circumferentially shorten said attaching device, substantially as described.

3. A tire-attaching device composed of a plurality of independent members, each having a laterally-extended shortening portion to operate under external pressure to shorten said attaching device, substantially as described.

4. A tire-attaching device composed of a plurality of independent members and laterally-extended engaging portions serving to unite said independent members one to another and to be changed in form under pressure to thereby shorten said attaching device in the direction of its length, substantially as described.

5. The combination with a yielding tire, of an attaching device therefor provided with one or more laterally-extended shortening portions to cause longitudinal shortening of the said attaching device under the action of pressure exerted thereupon through the medium of said tire, said lateral portions extending radially or in the plane of the wheel, substantially as described.

6. A tire-attaching device provided at its opposite edges with side-holding portions adapted to overlie the wheel-rim and prevent lateral displacement of said attaching device, said attaching device being constructed to change in form, under pressure, after application to and to tighten it upon the wheel-rim, substantially as described.

7. The combination with a tire-attaching device constructed to change in form and thereby shorten under external pressure, of a tire applied thereto and provided with covering-lips overlying the edges of said attaching device, substantially as described.

8. The combination with a yielding tire, of an attaching device permanently connected thereto, and means operated through the medium of the tire to permanently shorten said attaching device upon and to grip the wheel-rim, substantially as described.

9. A ring-like tire-attaching device, composed of a plurality of independent connected members, a plurality of which are provided with portions adapted to be changed or bent to shorten said attaching device in the direction of its length, substantially as described.

In testimony whereof I have signed my name to this specification in the presence of two subscribing witnesses.

ROBERT COWEN.

Witnesses:
WILLARD A. BULLARD,
DANL. N. CHAMBERLIN.